Figure 1:
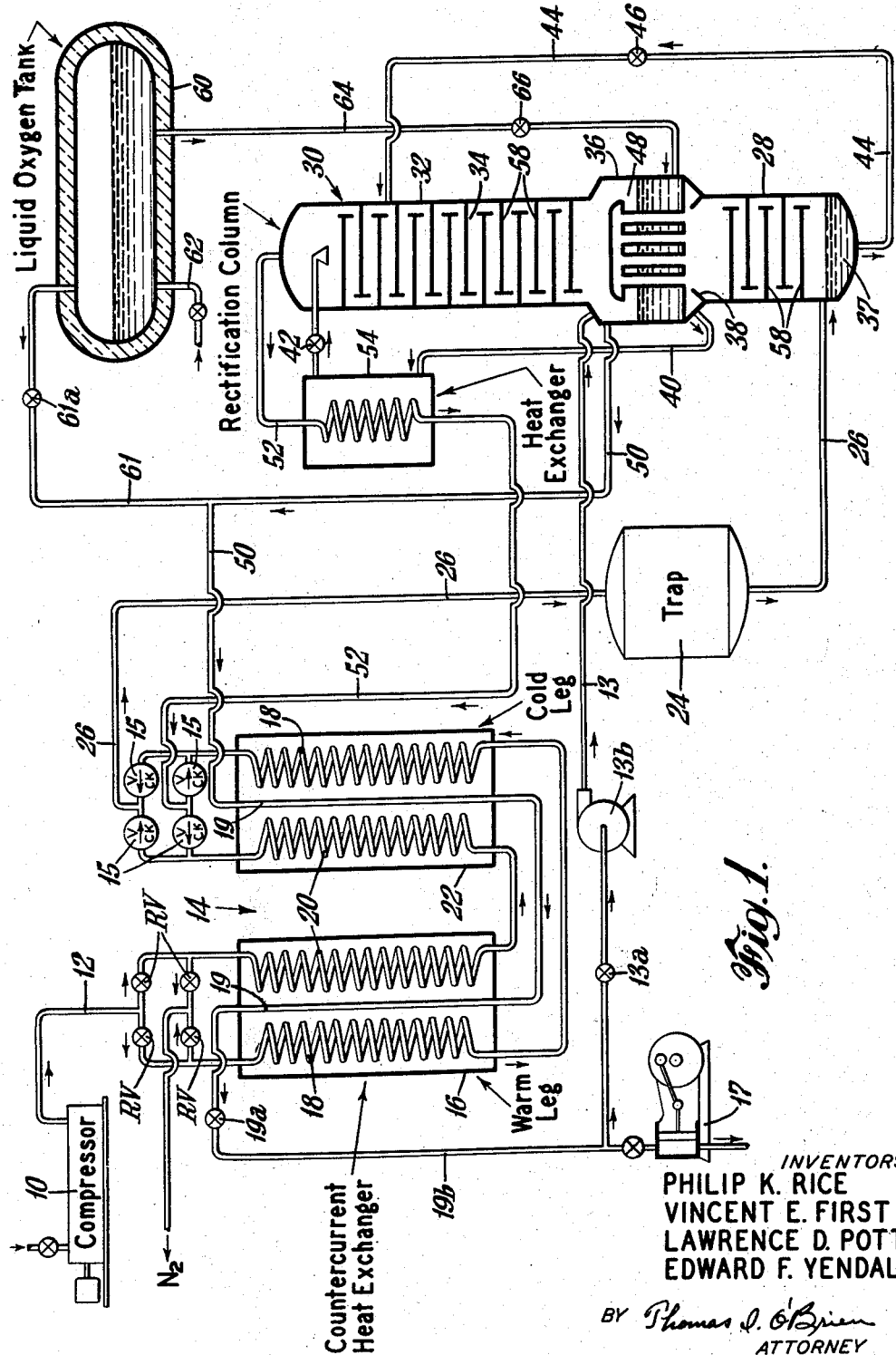

INVENTORS
PHILIP K. RICE
VINCENT E. FIRST
LAWRENCE D. POTTS
EDWARD F. YENDALL

BY Thomas J. O'Brien
ATTORNEY

INVENTORS
PHILIP K. RICE
VINCENT E. FIRST
LAWRENCE D. POTTS
EDWARD F. YENDALL
BY Thomas J. O'Brien
ATTORNEY

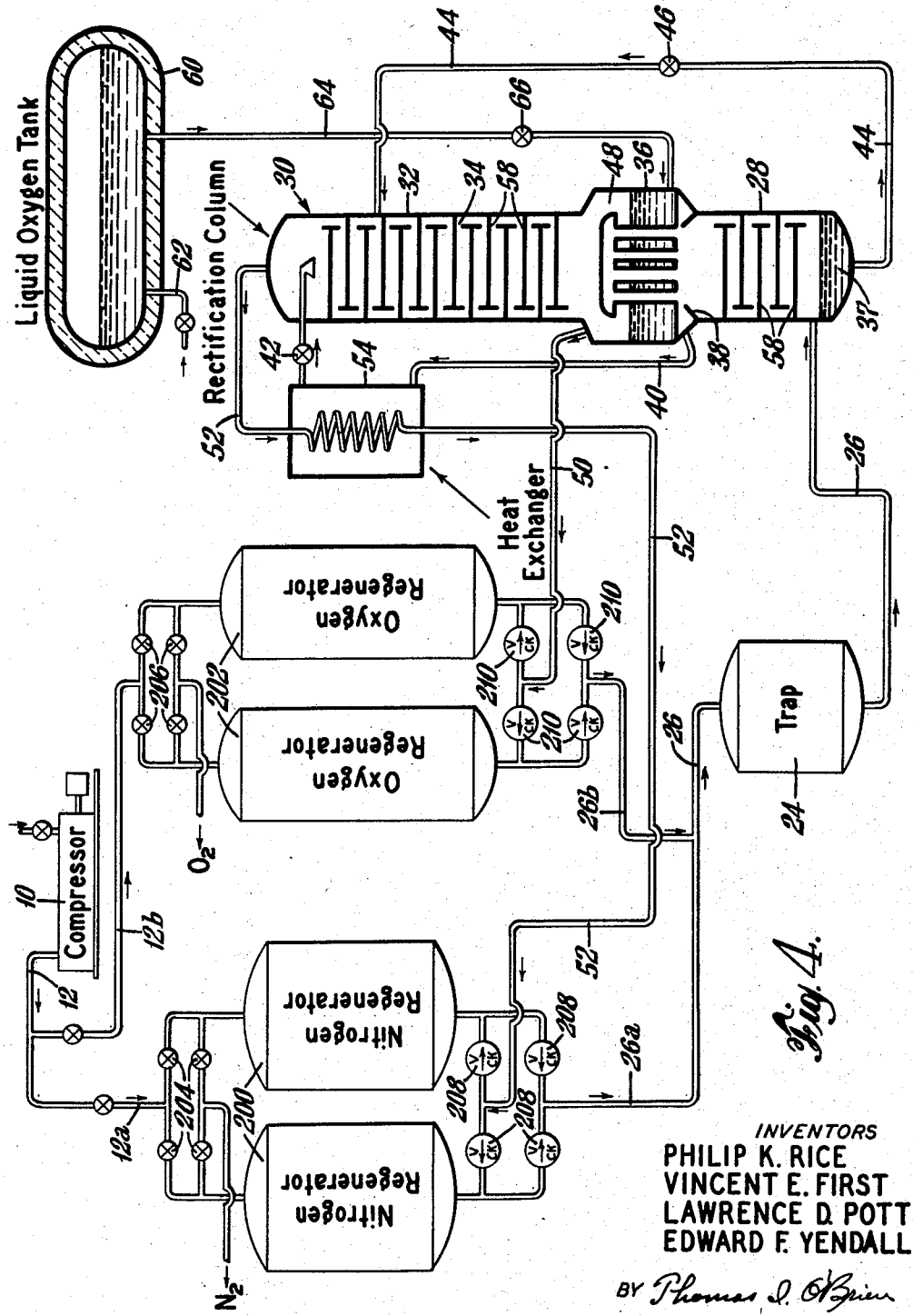

United States Patent Office 2,908,144
Patented Oct. 13, 1959

2,908,144

PROCESS AND APPARATUS FOR SEPARATING GAS MIXTURES

Vincent E. First, Kenmore, Lawrence D. Potts, Eggertsville, Philip K. Rice, White Plains, and Edward F. Yendall, Kenmore, N.Y., assignors to Union Carbide Corporation, a corporation of New York Application January 4, 1956, Serial No. 557,260

11 Claims. (Cl. 62—13)

This invention relates to an improved process and apparatus for the low-temperature separation of low boiling point gas mixtures such as air, for example, into higher and lower boiling point components, and it particularly concerns improvements resulting in the continuous removal from separation systems of higher boiling impurities separated in such systems by refrigeration.

Gas mixtures containing higher boiling point impurities, such as air, which contain water vapor and carbon dioxide, must be freed of such impurities when the gas mixture is to be separated into components by low temperature rectification. An economical method of eliminating these higher boiling impurities while efficiently cooling the gas mixture is to employ periodically reversed heat exchange units having a path in which gas mixture being cooled is passed in one direction therethrough and in which separation product being warmed passes in the opposite direction therethrough when the gas mixture has ceased the flow therein, the gas mixture flow and separation product flow being periodically interchanged to effect alternate deposition along the flow path of a major part of the so-called higher boiling impurities from the gas mixture and re-evaporation of such deposited impurities into the outflowing separation product. This is of particular economy when the gas mixture does not need to be compressed to high pressures causing excessive compression energy loss from flow reversal blowdown. However, one of the difficulties that arises in the use of such periodically reversed heat exchange units is that when the inflowing mixture and outflowing product are in balance, such higher boiling point impurities cannot normally be removed at the rate at which they are deposited in the heat exchange path and hence gradually accumulate in and block such path.

It is known that in such systems the temperature difference between incoming air and outgoing separation product increases toward the cold end of the heat exchange unit because of the greater specific heat of the compressed air at the lower temperatures. As a result of this temperature difference, there is also such a difference in the vapor pressure of the impurities during condensation and re-evaporation that the condensate cannot be removed by outgoing product completely at the rate at which it was deposited. This undesirable condition can be remedied by passing a greater mass of cold outflowing gas than incoming air through at least the colder part of the heat exchange unit to offset the greater specific heat of the compressed air and to reduce the temperature difference between the air and outflowing gas in the region of impurity deposition. In this way the temperature of the separation product passing through the reversing heat exchange path will be sufficiently close to the temperature of the air passed previously therethrough that it has sufficient capacity to reevaporate all the condensate deposited therein.

The periodically reversing heat exchange unit is generally of two varieties: a reversing passage heat exchanger and a cold accumulator or regenerator. As herein used, a heat exchange unit is intended to comprehend a single reversing passage heat exchanger or regenerator or two or more of such devices which together form a flow arrangement for effecting heat exchange between incoming air and outgoing products.

The general purpose of this invention, therefore, is to provide an improved method of thermally unbalancing air cleaning and cooling periodically reversed heat exchange units of low temperature air separation systems by utilization of refrigeration available in a body of stored cold liquid accessible thereto.

A specific object of this invention is the provision of an improved method of unbalancing such heat exchange units which results in substantially complete elimination of precipitated higher boiling impurities from such units continuously during operation of the system.

In accordance with the present invention, unbalance is achieved by utilizing the refrigeration available in a quantity of a cold substance other than a product of the immediate separation in the cold end of the heat exchange unit to adjust the temperature difference between incoming air and outgoing product. To achieve self-cleaning, the substance added must be sufficient to offset the difference in the specific heats of the incoming air and outgoing product in the region of the heat exchange unit where carbon dioxide occurs and so effect the reduction in the cold end temperature difference required for self-cleaning; i.e. complete re-evaporation in the reversing path of the heat exchanger by outgoing product of carbon dioxide precipitated from the incoming air during its passage through said path.

In one application of the present invention, the mass of outwardly flowing gas passing through at least the cold end of the air cooling and cleaning heat exchange unit of an air separation system is made to exceed the mass of incoming air passing through the same unit by adding to one of the effluent streams a quantity of cold gas other than a product of the immediate separation but having a composition similar to the separation product of such stream.

In achieving self-cleaning the outgoing product mass can be made to exceed incoming air mass either continuously or cyclically so long as the average unbalance is sufficient for self-cleaning. In an oxygen producing plant, the cold substance is preferably oxygen and is made up wholly or in part of oxygen that is derived from a store of liquid oxygen shipped to the plant from a large central plant and generally made available for supplying part of the oxygen demand when the plant cannot meet the demand and/or, if the plant has inadequate or no mechanical refrigeration-producing devices, for respecively supplying part or all of the low-temperature refrigeration required of the plant.

In one aspect of the invention where stored oxygen liquid is used to supply refrigeration to the plant, the oxygen can be mixed with the oxygen liquid product of the rectification, reboiled therewith, thereby giving up its refrigeration to the system, and passed with the oxygen make of the separation through an oxygen product pass in the heat exchange unit in such a manner to increase the outflowing gas mass. This results in greater outgoing gas mass flow than incoming air mass flow through the colder end of the heat exchange unit. The amount of liquid oxygen supplied for refrigeration purposes will not in many cases be enough to satisfy the requirements for self-cleaning, and in such cases, additional oxygen must be provided over and above the refrigeration requirements. Additional oxygen for self-cleaning may be added as a gas or as a liquid, provided in the latter instance that heat is made available to evaporate the liquid. In a preferred practice of the invention, where liquid addition for refrigeration purposes is insufficient for self-cleaning, the balance excess outgoing gas required for self-cleaning is made up in a major portion as oxygen make returned from the warm end of the heat exchange system to the reboiling zone of the rectification after passage through the oxygen supply line compressor and in a minor portion as added liquid.

Alternatively, oxygen may be returned from the warm end of the heat exchange system or from an intermediate point thereof by a separate blower or compressor.

In another aspect of the present invention, the unbalance cold outflowing gas is made up wholly or in part by evaporation from a cold liquid storage tank. The stored liquid means can be any liquid having the necessary refrigeration, such as nitrogen, air, or oxygen, but more commonly will be liquid oxygen held in a storage tank used in conjunction with the gas separation plant in providing the gas demand required. Vapor available from pump priming can also be used and may be considered as part of the same source; viz. evaporation from the storage tank. The storage tank may be used for supplying a product gas during peak periods when the separation plant supplies only a base or steady supply, for supplying liquid to meet at least a part of the external refrigeration requirements of the separation system, or both. The vapor available from the storage tank may be the normal evaporation resulting from heat leak or it may be the normal evaporation together with vapor resulting from the forced evaporation, such as, for example, the vapor resulting from the introduction of a gas of the same composition such as, for example, warm compressed oxygen in the oxygen consumer supply line, into the liquid of the storage tank.

Other objects, features and advantages of the present invention will become apparent in the following description of the accompanying drawings in which:

Figs. 1, 2, 3 and 4 are schematic flow diagrams illustrating exemplary air separation plants adapted for the practice of the present invention.

In the drawings, similar parts in the several figures are designated by the same reference characters.

Referring now to Fig. 1 of the drawings, the apparatus includes a compressor 10 which preferably compresses the air to a pressure of about 70 p.s.i.g. and delivers the air into a conduit 12 leading to the warm end of a periodically reversing heat exchange unit which is here shown as a countercurrent heat exchanger generally indicated at 14. The latter has a warm leg 16 with passageways 18, 19 and 20 connected with corresponding passageways in a cold leg 22. Incoming compressed air flowing in one direction through the heat exchanger is cooled to substantially its condensation temperature by effluent nitrogen and oxygen products flowing through the heat exchanger in the opposite direction. The countercurrent flows of the compressed air and nitrogen product are periodically alternated between passageways 18 and 20 by reversing valves RV and check valves 15, so that higher boiling impurities in the air stream deposited by condensation and accumulated in solid or liquid phase on the surfaces of a passageway in which the air is flowing will be regularly removed by the effluent nitrogen during the period when it flows through the same passageway. The oxygen product is conducted through passageway 19 in the cold and warm legs of the heat exchanger 14 to recover its refrigeration without contaminating it before it is discharged for distribution to consumer means. In this system residual hydrocarbon impurities and particles of residual carbon dioxide not deposited in the heat exchanger are removed from the air stream by an adsorbent trap 24 disposed in a conduit 26 leading from the cold end of the heat exchanger 14 to a high pressure column 28 of a two-stage rectification column indicated generally at 30.

The air rectification apparatus may be of customary construction and, in addition to the high pressure rectification or lower column 28, includes an upper, low pressure rectification column 32 having a rectifying section 34 and a reboiler section 36 at the lower end thereof which closes the high pressure column 28 and separates it from the upper column. The reboiler 36 operates in a customary manner to condense vapors rising in column 28, producing reflux for the high pressure column and also liquid nitrogen that is collected on a shelf 38 directly under part of the reboiler 36. The liquid nitrogen from the self 38 is throttled to a lower pressure and passed to the top of the upper column through a conduit 40 having a throttle valve 42. Oxygen-enriched liquid collected in a "kettle" 37 of the lower column is transferred to an intermediate part of the upper column 32 through a conduit 44, the higher pressure liquid being throttled to a low pressure by throttle valve 46 in conduit 44 before it is delivered into the upper column. The liquids transferred to the upper column provide reflux and are further rectified to obtain a cold, gaseous nitrogen product at the top part thereof and an oxygen product of desired purity at the lower part thereof. Oxygen-enriched liquid falling from the lowermost tray of the upper column passes into a liquid oxygen collecting space 48 of the reboiler 36 wherein it is vaporized by heat exchange with condensing fluid on the tube side of the reboiler. Part of this vapor is withdrawn from the rectification apparatus as oxygen-make product through conduit 50, and the remainder is passed into the rectifying section 34 to provide refluxing vapor for the low pressure rectification. The nitrogen product of the rectification is withdrawn from the upper column 32 through a conduit 52, which delievers the cold, gaseous effluent to check valves 15 at the cold end of the countercurrent heat exchanger 14. The nitrogen product may be passed through a heat-exchanger 54 disposed in conduit 52 to superheat the nitrogen effluent and at the same time subcool the shelf nitrogen liquid sufficiently to minimize flash-off when it is throttled to a lower pressure in valve 42. The rectification chambers 28 and 34 may be provided with the usual gas and liquid contact surfaces, such as trays 58.

The rectification system of Fig. 1 does not have a specific mechanical refrigeration-producing device, and the low temperature refrigeration needed for operation is obtained from a body of a low temperature liquid, preferably liquid oxygen, which is stored in an efficiently insulated tank 60 and from which liquid is fed to the air separating plant.

It is to be understood that the present invention is equally applicable to rectification system in which low temperature required is supplied in part by mechanical refrigeration-producing equipment and in part by refrigeration obtained from a body of low temperature liquid. The liquid oxygen employed for this use may be shipped to the plant in liquid form and is introduced into the tank 60 through a liquid inlet connection 62. It will be understood that all the liquid oxygen shipped to the plant is used to furnish gaseous oxygen. However, by utilizing the refrigeration in the liquid to operate the air separation plant, a much larger amount of oxygen can be produced than the amount produced by just evaporating liquid oxygen in storage tank 60.

The tank 60 is preferably situated at a higher elevation than the rectifying column, as shown in Fig. 1, so that gravity flow may be employed for draining liquid through the bottom of the storage tank to the rectification column. This avoids the need for a liquid pump. Tank liquid is delivered by a conduit 64 having a control valve 66 therein from tank 60 to the reboiler chamber reservoir or collecting space 48, where it is reboiled along with the oxygen-rich liquid in such space. Various other schemes for feeding liquid from the storage tank to the reboiler may also be used. For example, tank 60 may be positioned at a lower elevation than reboiler 36, providing a sufficient pressure differential is maintained between the tank and the reboiler for effecting transfer of liquid from the tank to the reboiler.

The oxygen product of the separation and the liquid oxygen addition from storage tank 60, which both boil in reboiler space 48, produce cold, gaseous oxygen that is conducted by conduit 50 to the non-reversing passageway 19 for passage through the cold and warm legs of the heat exchanger 14. In this way refrigeration in the oxygen product and the oxygen gas resulting from the liquid addition is recovered by the incoming air passing through the heat exchanger in a direction countercurrent to the oxygen flow without contaminating the oxygen. A valve 19a regulates the amount of oxygen withdrawn from the system.

In order to provide complete cleaning of impurities precipitated from the incoming gas and deposited in a reversing path of the heat exchanger 14, it has been found necessary to provide in the cold end thereof, a total mass of outwardly flowing gas which is greater than the mass of incoming gas. For example, in an air rectification process operated with air at 70 p.s.i. (gauge), the outflow through the cold end of the heat exchange unit, when it is a reversing heat exchanger as illustrated in Fig. 1, should be 7% to 10% greater than the inflow to insure dependable operation over a long period. By the principles of the present invention, the mass of outflowing products can be augmented without simultaneously increasing the mass of inflowing air by passing the oxygen, which is added in liquid form for refrigeration purposes, with oxygen separation product through the heat exchange unit. This is, for example, accomplished by admitting the liquid addition directly into the reboiler 36 where it is mixed and boiled with the liquid product of the rectification. Vapor resulting from such liquid addition is then passed with vapor resulting from the liquid separation product through the oxygen make conduit 50 and the non-reversing path 19 of the heat exchanger 14. The degree of thermal unbalance provided by the oxygen added for refrigeration may not be sufficient to achieve a self-cleaning condition for long periods of operation, and additional outflowing product must be provided over and above the separation products and the oxygen added for refrigeration.

In Fig. 1 a preferred scheme is shown for providing the necessary amount of excess products over and above that needed for refrigeration requirements. It comprises withdrawing warm oxygen from the oxygen supply line 19b and returning the same to the reboiler 36 by means of a blower 13b through conduit 13 having a control valve 13a therein. Alternatively, oxygen could be returned from an intermediate point of the heat exchanger or from a point downstream of at least a first stage of the oxygen make-compressor 17. This adds heat to the reboiler and allows a higher rate of oxygen make withdrawal without sacrificing purity. Additional refrigeration is supplied by increasing the amount of liquid added to the reboiler from storage tank 60. In this way the liquid in the reboiler is maintained at a desired level and sufficient excess cold gas is made available for passage through the heat exchanger 14 to achieve a self-cleaning condition. Evaporation resulting from heat leak to the storage tank 60 is also passed by way of conduit 61 to the oxygen make conduit 50 for passage of the oxygen product through the heat exchanger 14. This correspondingly reduces the amount of excess product needed over and above that added for refrigeration purposes.

Figure 2:
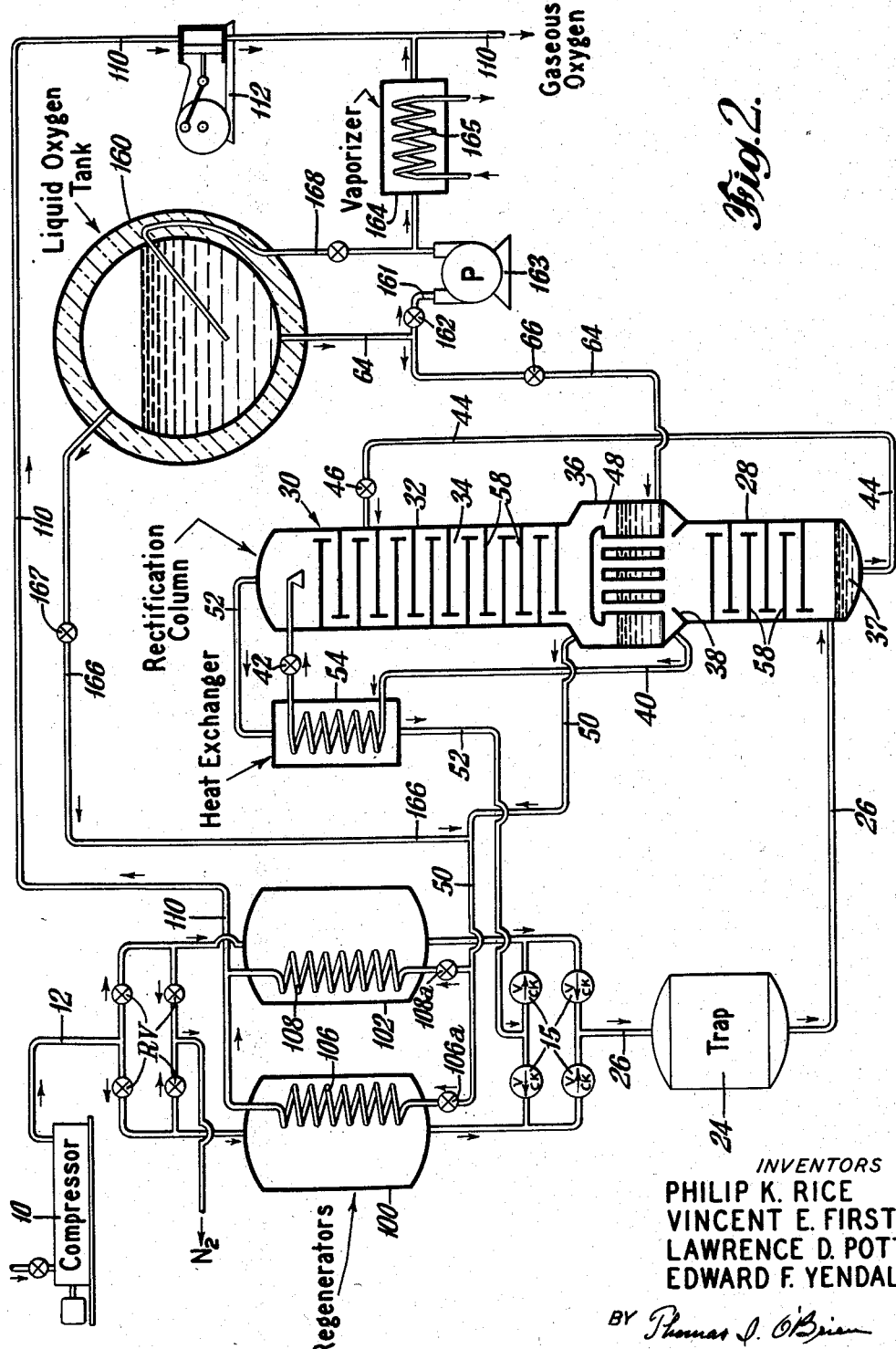
Figure 3:
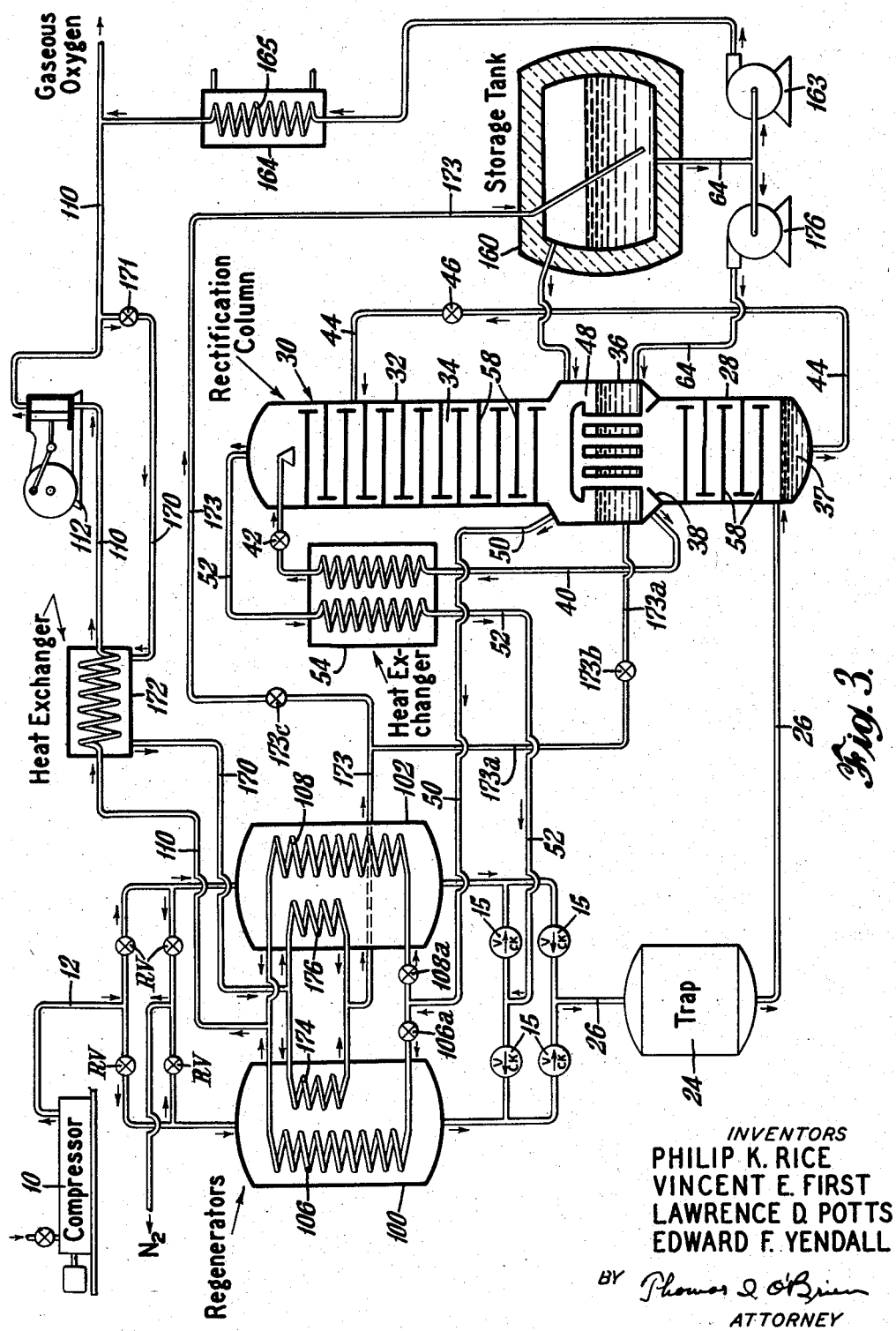

The apparatus of Figs. 2 and 3 is similar to that of Figure 1 with respect to the elements designated by the same reference characters, but differs in several respects relating to the ways in which the unbalance excess outgoing product is provided for effecting self-cleaning. In Fig. 2 a pair of switching regenerators 100 and 102 are employed in place of reversing heat exchangers for cooling incoming air with outgoing products. Compressed air in supply line 12 is passed alternately by reversing valves RV through regenerators 100 and 102, with the off-stream regenerator being purged and cooled by outflowing nitrogen product. Outgoing oxygen is preferably divided and passed in continuous flow through both regenerators in embedded passages 106 and 108. Air which has been freed of moisture and carbon dioxide in the regenerators is conducted by conduit 26 through an adsorbent trap 24 wherein residual hydrocarbon impurities and carbon dioxide particles are removed and thence to the lower end of the high pressure rectification column 28.

The rectification of Figures 2 and 3 is similar to that of Fig. 1 and is believed clear from the foregoing description. Effluent nitrogen product passes from the top of the rectification column 32 through a heat exchanger 54 and is directed by check valves 15 at the cold end of the regenerators 100 and 102 alternately therethrough. Oxygen product is withdrawn from the column 32 by way of conduit 50 which delivers it to the cold end of the regenerators for passage through passageways 106 and 108 and then into the oxygen make supply line 110 having a compressor 112 therein for raising the pressure of the gaseous oxygen to consumer line pressure.

Although it has been described that the outgoing oxygen stream is split and passed through both regenerators simultaneously, it should be understood that all of the outgoing oxygen could be passed into a single stream alternately through one regenerator and then the other, either in phase with the switching cycle of the nitrogen and air or out of phase therewith. For example, the outgoing oxygen stream can be passed through each regenerator during the last half of the air-in-flow half cycle and during the first half of the nitrogen-out-flow half cycle. For these purposes there is provided control valves 106a and 108a, the opening and closing of which may be timed to effect any desired oxygen flow.

The low temperature refrigeration requirements of the system of Fig. 2 are, as in Fig. 1, met by the addition of liquid oxygen from a storage tank 160, which in this embodiment also serves to supply gaseous oxygen directly to the consumer supply line 110. This type of system is now employed when the air separation plant supplies a steady base load but cannot by itself meet peak demands. If pipe line pressure is low, liquid from tank 160 is fed through a pipe 161 controlled by valve 162 to a pump 163, which may be similar in construction to the pump described in U.S. Patent No. 2,455,460 to G. H. Zenner. From pump 163 the liquid may be fed through a suitable vaporizer 164 heated by a warm fluid in coil 165 and the resulting gas passed to the oxygen supply line 110.

In the operation of the embodiment of Fig. 2, the unbalance cold outflowing gas is made up by oxygen gas resulting from vaporization of liquid added to the rectification through conduit 64 for low temperature refrigeration needs. The gas used for unbalance can be augmented by evaporation of oxygen liquid in the storage tank 160. The evaporated liquid is drawn off through conduit 166 and delivered into the oxygen make line 50, the connection 166 for such purpose being controlled by valve 167. The amount of evaporation available from the storage tank is augmented by the gas produced in priming the delivery pump 163. Such gas is returned from the pump to the tank by way of conduit 168 and is available for delivery into the oxygen make line 50.

The embodiment of Fig. 3 is similar to Fig. 2, except that part of the warm compressed oxygen product is returned as required either to the oxygen reboiler 36 or to the storage tank 160 to provide sufficient cold oxygen gas to satisfy the heat exchange unbalancing needs of the plant. For this purpose there is provided a conduit 170 controlled by valve 171 through which a part of the warm oxygen product is withdrawn from the oxygen supply conduit 110 after passage through the oxygen make compressor 112. The withdrawn gas is passed in heat exchange with the oxygen make stream prior to compression in a heat exchanger 172 and is then partly recooled by passage through coils 174 and 176 in the warm end of the regenerators 100 and 102, respectively, the warm oxygen passing through such warm ends in the same direction of flow as that of the air flow. The flow through the regenerators may be in parallel as shown or it may be alternately through one regenerator and then the other. The partly recooled clean oxygen gas is then delivered either into the oxygen reboiler 36 by conduit 173a having control valve 173b or into the storage tank 160 by conduit 173 which terminates below the liquid level of the tank so as to cause the relatively warm gas to bubble through the liquid in the tank and thereby increase its rate of evaporation. When flow of return oxygen is to the reboiler, valve 173c in conduit 173 is closed. Storage tank evaporation, together with oxygen make gas circulated through the storage tank, is added to the products of the separation by passage directly into the oxygen make conduit 50, as in Fig. 2, or by delivery into the gas phase of the oxygen reboiler 36 as shown. In this way a positive supply of unbalance gas in excess of the oxygen used for supplying low temperature refrigeration is made available for meeting the unbalance needs of the separation system. By bubbling the warm compressed oxygen through the cold liquid oxygen in the storage tank, the amount of refrigeration lost in achieving unbalance is minimized, for the excess cold gas needed is supplied in a minor portion as evaporated liquid and in a major portion of warm compressed gas which is recooled to saturation by the liquid evaporation.

In the embodiment of Fig. 3, liquid from the storage tank 160 is fed to the rectification reboiler 36 for refrigeration purposes by a pump 176. It should be understood that the low temperature refrigeration supplied by the feeding of stored liquid to the rectification is not necessarily the entire low temperature refrigeration requirements of the plant but may form only a part of such requirements as in the case where mechanical refrigeration producing apparatus is also present in the system to supply part of the refrigeration requirements.

Figure 4 shows the application of the principles of this invention to a low purity oxygen gas plant. Compressed air from compressor 10 is cooled to substantially its condensation temperature by passage through alternately reversed pairs of regenerators 200 and 202, the pair of regenerators 200 being cooled by outflowing nitrogen product and the regenerators 202 being cooled by outflowing oxygen product. The air is conducted to the warm ends of the regenerators by conduit 12 having branches 12a and 12b that connect respectively to reversing valves 204 and 206 at the warm ends respectively of regenerators 200 and 202. Sets of check valves 208 and 210 at the cold ends of the regenerators 200 and 202 discharge the cooled air, which has been freed of moisture and carbon dioxide in the regenerators to branch conduits 26a and 26b leading to conduit 26 that conveys the air through a trap 24 and thence into the lower rectification column 28.

Low temperature refrigeration is provided by a cold liquid which is fed from a storage tank 60 in the same manner as described with reference to Fig. 1. The gas resulting from the liquid added to the system is passed out through the regenerators with the products of the separation. In a low purity system such as illustrated in Fig. 4, all the outgoing gas is used to re-evaporate deposited impurities in the regenerators and the degree of unbalance required for achieving self-cleaning is not as great as that required in high purity systems wherein all or part of the oxygen is passed through non-reversing and uncontaminated heat exchange paths.

Consequently, the gas resulting from the liquid addition for refrigeration purposes can, if passed outwardly through the regenerators of a low purity system, supply all or nearly all the unbalance required for self-cleaning, providing the incoming air flow is properly proportioned between the two pairs of regenerators. For example, if liquid oxygen is employed, the nitrogen regenerators are unbalanced by passing less than the nitrogen percentage of the air through the nitrogen regenerators 200 and correspondingly increasing the percentage of air passed through the oxygen regenerators. In this way the mass of separated nitrogen which passes out through regenerators 200 is in excess of the mass of incoming air passing therethrough and the separated oxygen, together with the gas resulting from liquid addition passing through the oxygen regenerators will exceed the mass of incoming air passing through the oxygen regenerators.

Liquid nitrogen or liquid air could also be used alternatively to supply refrigeration and unbalance gas. For example, liquid nitrogen could be added to the nitrogen shelf in the lower rectification columns (indicated at 38 in Fig. 1) or to the top of the upper rectification column. Liquid air could be introduced into the kettle 37 of the lower column.

It should also be understood that the stored liquid which is supplied to meet part of or all the the low-temperature refrigeration required by the rectification need not be stored in the same body or tank as that supplying the excess gas to meet peak demands. Hence, as used herein, "storage body" is intended to comprehend both storage bodies if separate ones are used. The term "storage body" is also intended to cover an oversized reboiler, for cold liquid from a separate source could be introduced directly into and stored in such a reboiler. Changes in the details of the systems herein disclosed may be made without departing from the scope of the invention as defined in the following claims.

What is claimed is:

1. In a process for the low-temperature separation of a gas mixture containing high and low boiling components and higher boiling impurities by rectification, in which gas mixture to be cooled and separation product to be warmed are alternately passed in opposite directions through a reversing flow path in a heat exchange unit to effect alternate deposition along said flow path of a major part of the higher boiling impurities from the inflowing gas mixture and re-evaporation of such deposited impurities into the outflowing separation product, the steps comprising providing an independent storage body of low temperature liquid received from a source separate from the rectification; withdrawing liquid from said independent storage body and vaporizing such liquid to supply low-temperature refrigeration to the rectification; and adjusting the temperature differences between the incoming and outgoing flows to a value low enough to effect re-evaporation by outflowing product of substantially all deposited impurities by passing vapor resulting from the vaporization of the withdrawn liquid through said heat exchange zone, said adjustment being independent of the adjustment of the refrigeration delivered to and required by the rectification.

2. In a process for the low-temperature separation of air by rectification, in which air to be cooled and nitrogen product to be warmed are alternately passed in opposite directions through a reversing flow path in a heat exchange unit to effect alternate deposition along the flow path of water and carbon dioxide impurities from the inflowing air and re-evaporation of such deposited impurities into the outflowing nitrogen product and in which oxygen product to be warmed is passed cocurrently with the nitrogen product flow through another flow path in said heat exchange unit, the steps comprising providing an independent storage body of low temperature liquid received from a source separate from the rectification but having a composition similar to one of the separation products; withdrawing liquid from said independent storage body and vaporizing the liquid to supply low-temperature refrigeration to the rectification; and adjusting the temperature differences between the incoming and outgoing flows to a value low enough to effect re-evaporation by outflowing product of substantially all deposited impurities by passing vapor resulting from the vaporization of the withdrawn liquid with the separation product of similar composition through the same path of said heat exchange unit traversed by said product, said adjustment being independent of the adjustment of the refrigeration delivered to and required by the rectification.

3. In a process for the low-temperature separation of air by rectification, in which air to be cooled and nitrogen product to be warmed are alternately passed in opposite directions through a reversing flow path in a heat exchange unit to effect deposition along the flow path of water and carbon dioxide impurities from the inflowing air and re-evaporation of such deposited impurities into the outflowing nitrogen product and in which oxygen product to be warmed is passed cocurrently with the nitrogen product flow through another non-reversing flow path in said heat exchange unit, the steps of providing an independent storage body of oxygen liquid received from a source separate from the rectification; withdrawing liquid from said independent body; mixing withdrawn liquid with oxygen product liquid of the rectification which is to be reboiled for supplying low temperature refrigeration to the rectification; and passing vapor resulting from the reboiling of the rectification liquid and said withdrawn liquid through the non-reversing oxygen product flow path in said heat exchange unit, thereby reducing the temperature difference between the incoming and outgoing flows to a value that is smaller than that which would exist but for such passage of the vapor resulting from said withdrawn liquid, the reduction of said temperature difference being independent of the adjustment of the refrigeration delivered to and required by the rectification.

4. In a process for the low-temperature separation of air by rectification in which air to be cooled and nitrogen product to be warmed are alternately passed in opposite directions through a reversing flow path in a heat exchange unit to effect alternate deposition along the flow path of water and carbon dioxide impurities from the inflowing air and re-evaporation of such deposited impurities into the outflowing nitrogen product and in which oxygen product to be warmed is passed cocurrently with the nitrogen product flow through another flow path in said heat exchange unit, the steps of providing an independent storage body of liquid oxygen received from a source separate from the rectification; withdrawing oxygen liquid from said independent body and utilizing part of such withdrawn liquid to supply low temperature refrigeration to the rectification; utilizing the remainder of said withdrawn liquid to cool a relatively warm gas; passing vapor resulting from the utilization of said withdrawn liquid and the gas cooled by withdrawal liquid through at least the colder region of said heat exchange unit; said vapor and gas being sufficient in quantity to adjust the temperature of the outgoing nitrogen close enough to that of the incoming air in said colder region to effect complete re-evaporation of said deposited impurities by said nitrogen product, said adjustment being independent of the adjustment of the refrigeration delivered to and required by the rectification.

5. In a process for the low-temperature separation of air by rectification in which air to be cooled and nitrogen product to be warmed are alternately passed in opposite directions through a reversing flow path in a heat exchange unit to effect alternate deposition along the flow path of water and carbon dioxide impurities from the inflowing air and re-evaporation of such deposited impurities into the outflowing nitrogen product and in which oxygen product to be warmed is passed cocurrently with the nitrogen product flow through a non-reversing flow path in said heat exchange unit, the steps of providing a storage body of liquid oxygen received from a source separate from the rectification; withdrawing oxygen liquid in excess of that required to supply low-temperature refrigeration to the rectification; passing said withdrawn oxygen liquid to the rectification; recirculating a portion of oxygen product after passage through at least the colder region of said non-reversing flow path to the rectification; the excess withdrawn liquid being sufficient to provide enough refrigeration to recool said recirculated oxygen product; and passing oxygen vapor resulting from said withdrawn liquid and from the recooling of said oxygen product through the non-reversing flow path along at least the colder region of said heat exchange unit.

6. In a process for the low-temperature separation of a gas mixture containing high and low boiling components and higher boiling impurities by rectification, in which gas mixture to be cooled and separation product to be warmed are alternately passed in opposite directions through a reversing flow path in a heat exchange unit to effect alternate deposition along said flow path of a major part of the higher boiling impurities from the inflowing gas mixture and reevaporation of such deposited impurities into the outflowing separation product, the steps comprising providing an independent storage body of low temperature liquid received from a source separate from the rectification; withdrawing liquid from said independent body in excess of that required to supply the required low-temperature refrigeration to the rectification; passing such liquid to the rectification apparatus and recovering such required low-temperature refrigeration therein by vaporization of the required quantity of liquid; passing the vapor resulting from such vaporization through at least the colder region of said heat exchange unit; providing a warm gas stream and heat exchanging such stream with the excess low temperature liquid in said rectification apparatus so as to vaporize such excess liquid and form a cold vapor therefrom; and passing the re-cooled gas stream and said cold vapor through at least the colder region of said heat exchange unit, the gas and vapor streams being in sufficient quantity to adjust the temperature of the outflowing separation product close enough to that of the incoming gas mixture in said colder region to effect complete reevaporation of said deposited impurities by said outflowing product, said adjustment being independent of the low-temperature refrigeration delivered to and required by said rectification apparatus.

7. In a process for the low-temperature separation of air by rectification in which air to be cooled and nitrogen product to be warmed are alternately passed in opposite directions through a reversing flow path in a heat exchange unit to effect alternate deposition along the flow path of water and carbon dioxide impurities from the inflowing air and reevaporation of such deposited impurities into the outflowing nitrogen product and in which oxygen product to be warmed is passed cocurrently with the nitrogen product flow through another flow path in said heat exchange unit, the steps comprising providing an independent storage body of liquid oxygen received from a source separate from the rectification; withdrawing oxygen liquid from said independent body in excess of that required to supply the required low-temperature refrigeration to the rectification; passing such liquid to the rectification apparatus and recovering such required low-temperature refrigeration therein by vaporization of the required quantity of liquid; passing the vapor resulting from such vaporization through the oxygen product flow path along at least the colder region of said heat exchange unit; providing a warm oxygen gas stream and passing such stream in heat exchange with the excess low temperature liquid in said rectification apparatus so as to vaporize such excess liquid and form cold vapor therefrom; and passing the re-cooled oxygen gas stream and the cold oxygen vapor through the oxygen product flow path along at least the colder region of said heat exchange unit, the gas and vapor streams being in sufficient quantity to adjust the temperature of the outflowing nitrogen product close enough to that of the incoming air stream in said colder region to effect complete reevaporation of said deposited impurities by said nitrogen product, said adjustment being independent of the low-temperature refrigeration delivered to and required by said rectification apparatus.

8. A process according to claim 7 for the low-temperature separation of air, in which at least part of said gas and vapor streams having passed through the oxygen product flow path are recycled to said rectification apparatus as at least part of said warm oxygen gas stream.

9. In a low-pressure process for the low-temperature separation of air by rectification in which air to be cooled and nitrogen product to be warmed are alternately passed in opposite directions through the complete length of a reversing flow path in a heat exchange unit to effect alternate deposition along the flow path of water and carbon dioxide impurities from the inflowing air and reevaporation of such deposited impurities into the outflowing nitrogen product and in which oxygen product to be warmed is passed cocurrently with the nitrogen product flow through another flow path in said heat exchange unit, the steps comprising providing an independent storage body of liquid oxygen received from a source separate from the rectification; continuously withdrawing oxygen liquid from said independent body in excess of that required to supply the required low-temperature refrigeration to the rectification; continuously passing such liquid to the rectification zone and recovering such required low-temperature refrigeration therein by vaporization of the required quantity of liquid; passing the vapor resulting from such vaporization through the oxygen product flow path along at least the colder region of said heat exchange unit; providing a warm oxygen gas stream and pasing such stream in heat exchange with the excess low temperature liquid in said rectification apparatus so as to vaporize such excess liquid and form cold vapor therefrom; and passing the recooled oxygen gas stream and the cold oxygen vapor through the oxygen product flow path along at least the colder region of said heat exchange unit, the gas and vapor streams being in sufficient quantity to adjust the temperature of the outflowing nitrogen product close enough to that of the incoming air stream in said colder region to effect complete reevaporation of said deposited impurities by said nitrogen product and thereby establish a self-cleaning pattern in said heat exchange unit, said adjustment being independent of the low-temperature refrigeration delivered to and required by the rectification.

10. In a process for the low-temperature separation of air by rectification, in which air to be cooled and nitrogen product to be warmed are alternately passed in opposite directions through a reversing flow path in a heat exchange unit to effect deposition along the flow path of water and carbon dioxide impurities from the inflowing air and re-evaporation of such deposited impurities into the outflowing nitrogen product and in which oxygen product to be warmed is passed cocurrently with the nitrogen product flow through another flow path in said heat exchange unit, the steps comprising providing an independent storage body of low temperature liquid received from a source separate from the rectification; withdrawing vapor from the vapor phase of said body; and adjusting the temperature differences between the incoming and outgoing flows to a value low enough to effect re-evaporation by outflowing product of substantially all deposited impurities by introducing said vapor into the one of said products for passage therewith through its path of flow through said heat exchange zone thereby recovering refrigeration from said vapor, said adjustment being independent of the adjustment of the refrigeration delivered to and required by the rectification.

11. In a process for the low-temperature separation of air by rectification, in which air to be cooled and nitrogen product to be warmed are alternately passed in opposite directions through a reversing flow path in a heat exchange unit to effect deposition along the flow path of water and carbon dioxide impurities from the inflowing air and re-evaporation of such deposited impurities into the outflowing nitrogen product and in which oxygen product to be warmed is passed cocurrently with the nitrogen product flow through another non-reversing flow path in said heat exchange unit, the steps comprising providing an independent storage body of liquid oxygen received from a source separate from the rectification; withdrawing oxygen from the liquid phase of said independent body; vaporizing said liquid, and passing said vapor with oxygen make vapor through the non-reversing flow path of said heat exchange zone to recover refrigeration from said vapor and reduce the temperature difference between the incoming and outgoing flows to a value that is smaller than that which would exist but for such passage of said vapor, the reduction of said temperature difference being independent of the adjustment of the refrigeration delivered to and required by the rectification.

References Cited in the file of this patent

UNITED STATES PATENTS

| | | |
|---|---|---|
| 1,020,102 | Linde | Mar. 12, 1912 |
| 2,180,715 | Messer | Nov. 21, 1939 |
| 2,287,158 | Yendall | June 23, 1942 |
| 2,513,306 | Garbo | July 4, 1950 |
| 2,541,409 | Cornelius | Feb. 13, 1951 |
| 2,547,177 | Simpson | Apr. 3, 1951 |
| 2,586,811 | Garbo | Feb. 26, 1952 |
| 2,615,312 | Yendall | Oct. 28, 1952 |
| 2,664,718 | Rice | Jan. 5, 1954 |